United States Patent
Smith et al.

[11] Patent Number: 5,881,972
[45] Date of Patent: Mar. 16, 1999

[54] ELECTROFORMED SHEATH AND AIRFOILED COMPONENT CONSTRUCTION

[75] Inventors: Blair A. Smith, South Windsor; John M. Graff, West Suffield, both of Conn.

[73] Assignee: United Technologies Corporation, Windsor Locks, Conn.

[21] Appl. No.: 811,628

[22] Filed: Mar. 5, 1997

[51] Int. Cl.$^6$ .................................................. B64C 3/36
[52] U.S. Cl. ........................... 244/123; 244/133; 416/224
[58] Field of Search ..................................... 244/121, 133, 244/123; 416/223 B, 224, 236 R; 415/914; 29/458, 463, 889.71, 889.72; 205/216, 67, 118, 283, 114

[56] References Cited

U.S. PATENT DOCUMENTS

| | | | |
|---|---|---|---|
| 3,732,031 | 5/1973 | Bowling | 416/231 |
| 4,121,894 | 10/1978 | Cretella et al. | 416/224 |
| 4,163,071 | 7/1979 | Weatherly et al. | 416/231 |
| 4,366,034 | 12/1982 | Ricks et al. | 205/216 |
| 4,441,857 | 4/1984 | Jackson et al. | 416/224 |
| 4,725,490 | 2/1988 | Goldberg | 244/133 |
| 4,728,554 | 3/1988 | Goldberg et al. | 244/133 |
| 4,943,485 | 7/1990 | Allam et al. | 428/457 |
| 5,306,120 | 4/1994 | Hammer et al. | 416/224 |
| 5,560,569 | 10/1996 | Schmidt | 244/121 |
| 5,601,933 | 2/1997 | Hajmrle et al. | 416/241 |

Primary Examiner—Galen L. Barefoot

[57] ABSTRACT

A sheath for covering and protecting a component leading edge of an airfoiled component is disclosed. The sheath includes a sheath leading edge, and a first protective side and a second protective side, wherein the first and second protective sides are merged at the sheath leading edge. A cavity is formed between the first and second protective sides, wherein the cavity is adapted to have the airfoiled component positioned therein and engage an inside surface of each of the first and second protective sides. The sheath is formed from a material including cobalt, and preferably a nickel-cobalt composition. Preferred embodiments include cobalt in the nickel-cobalt composition present between 8–32 wt. % and 30–54 wt. %, based on the weight of the sheath. An airfoiled component construction is also disclosed. This construction includes a main structural component formed in the shape of an airfoil, wherein the main structural component has a leading edge, and a sheath covering and protecting the leading edge, wherein the sheath is formed from a material including cobalt such as a nickel-cobalt composition. Preferred embodiments include cobalt in the nickel-cobalt composition present between 8–32 wt. % and 30–54 wt. %, based on the weight of the sheath.

18 Claims, 2 Drawing Sheets

| MATERIAL | ANGLE OF ATTACK | EROSION RATE (CC/kG) | EROSION RATE (%) | EROSION RESISTANCE (%) |
|---|---|---|---|---|
| NiCo–42% (536 VHN) | 90° | 0.157 | 76.21% | 131.21% |
| SULF NI (BASELINE) | 90° | 0.206 | 100.00% | 100.00% |
| MODIFIED WATT'S NICKEL | 90° | 0.210 | 101.94% | 98.10% |
| NiCo–20.4% (450 VHN) | 90° | 0.212 | 102.91% | 97.17% |
| Ti 6–4 | 90° | 0.437 | 212.14% | 47.14% |
| NiCo–42% (536 VHN) | 20° | 0.170 | 54.66% | 182.94% |
| NiCo–20.4% (450 VHN) | 20° | 0.255 | 81.99% | 121.96% |
| MODIFIED WATT'S NICKEL | 20° | 0.303 | 97.43% | 102.64% |
| SULF NI (BASELINE) | 20° | 0.311 | 100.00% | 100.00% |
| Ti 6–4 | 20° | 0.378 | 121.54% | 82.28% |

FIG.1
Prior Art

| MATERIAL | ANGLE OF ATTACK | EROSION RATE (CC/kG) | EROSION RATE (%) | EROSION RESISTANCE (%) |
|---|---|---|---|---|
| SULF NI (BASELINE) | 90° | 0.206 | 100.00% | 100.00% |
| MODIFIED WATT'S NICKEL | 90° | 0.210 | 101.94% | 98.10% |
| Ti 6-4 | 90° | 0.437 | 212.14% | 47.14% |
| MODIFIED WATT'S NICKEL | 20° | 0.303 | 97.43% | 102.64% |
| SULF NI (BASELINE) | 20° | 0.311 | 100.00% | 100.00% |
| Ti 6-4 | 20° | 0.378 | 121.54% | 82.28% |

FIG.4

| MATERIAL | ANGLE OF ATTACK | EROSION RATE (CC/kG) | EROSION RATE (%) | EROSION RESISTANCE (%) |
|---|---|---|---|---|
| NiCo-42% (536 VHN) | 90° | 0.157 | 76.21% | 131.21% |
| SULF NI (BASELINE) | 90° | 0.206 | 100.00% | 100.00% |
| MODIFIED WATT'S NICKEL | 90° | 0.210 | 101.94% | 98.10% |
| NiCo-20.4% (450 VHN) | 90° | 0.212 | 102.91% | 97.17% |
| Ti 6-4 | 90° | 0.437 | 212.14% | 47.14% |
| NiCo-42% (536 VHN) | 20° | 0.170 | 54.66% | 182.94% |
| NiCo-20.4% (450 VHN) | 20° | 0.255 | 81.99% | 121.96% |
| MODIFIED WATT'S NICKEL | 20° | 0.303 | 97.43% | 102.64% |
| SULF NI (BASELINE) | 20° | 0.311 | 100.00% | 100.00% |
| Ti 6-4 | 20° | 0.378 | 121.54% | 82.28% |

ELECTROFORMED SHEATH AND AIRFOILED COMPONENT CONSTRUCTION

TECHNICAL FIELD

This invention is related to protective sheaths for airfoiled components such as composite propeller blades, fan blades, exit guide vanes, and aircraft struts, and more particularly, to an electroformed sheath formed at least in part from cobalt, and most preferably from a nickel-cobalt composition.

BACKGROUND ART

To increase operating efficiencies of modern aircraft engines, it is desirable to decrease weights of airfoiled component parts such as jet engine fan blades, exit guide vanes, aircraft propeller blades and certain structural support members positioned in air streams. Substantial decreases in weights of such components have been achieved through use of composite materials including for example graphite fiber reinforcements with an epoxy matrix. Composite components, at their leading edges, fail to provide adequate strength to protect themselves from erosion and foreign object damage and especially from damage as a result of leading edge impact with birds, ice, stones, sand, rain and other debris. Adding further to their fragility, these components are usually quite thin and as a result even more susceptible to foreign object damage. Accordingly, protective sheaths are often used to protect the leading edge.

The art of manufacturing electroformed sheaths is well known, as described for example in U.S. Pat. No. 4,950,375 to Leger. Typically a die or mandrel, made of conductive material such as titanium, is formed to have an exterior surface that conforms to a blade's airfoil configuration minus the thickness of the sheath to be electroformed on the mandrel. Desired thicknesses of the sheath are achieved by a well-known process of shielding, wherein barrier walls or shields are placed adjacent the mandrel in such positions that shields direct the flow of electrical current between the anodes and the exposed work surface of the mandrel in the electroplate solution. For example, where a sheath leading edge must be thicker and hence stronger than a sheath trailing edge, the shield portion adjacent a first surface section of the mandrel palm, which has the form of the sheath leading edge, would be positioned a greater distance from the surface section of the mandrel than a shield portion adjacent a second surface section of the mandrel palm, which is forming the sheath trailing edge. After the mandrel has been in the electroplate bath for a predetermined time, it is removed. The electroformed sheath is next mechanically removed from the mandrel. The sheath exterior may then be machined to provide a smooth, aerodynamic contour. It is then pressed fit over and bonded to the composite blade, in a manner well-known in the art.

A material typically used in the quest for achieving leading edge protection is a nickel electroform produced from modified Watt's nickel electrolyte. This material is very hard, greater than 600 VHN, and is inclined to be relatively brittle. It may be subject, therefore, to cracking, fracture, chipping, and breaking apart upon a direct 90° impact by foreign objects. Another material for use in erosion resistance is titanium 6Al-4V, which is typically used for the construction of most jet engine fan blades. Still another material which is used in forming electroformed sheath is hardened sulfamate nickel.

Table 1 is indicative of an example of the erosion and impact resistance for modified Watt's nickel (700 VHN), hardened sulfamate nickel (470 VHN) and titanium 6Al-4V, at 20° and 90° angles, with sand as the erosion medium traveling at 800 ft/sec. The hardened sulfamate nickel results were used as the baseline measurement for the remaining erosion determinations. As can be seen, the titanium is clearly surpassed by the Modified Watt's nickel and hardened sulfamate nickel in erosion rate and total erosion at both the 20° and 90° angles. Not only did the titanium perform relatively badly in these tests, it is also very expensive and typically only used with high output jet engines which have financial budgets and structural requirements far exceeding those of other aerospace components, such as propellers. Due to the expense of the titanium, it would be desirable to have a more economically and better performing electroform sheath for protection of jet engine components, so as to reduce the cost of the same. With particular respect to propeller blades, recent events have indicated an alarmingly fast rate of replacement, due to breakage, of modified Watt's nickel electroformed sheaths, which are highly used in the industry. The high replacement rate seems due to a combination of the hardness, brittleness, and low ductility, of this material, as indicated above. In testing, and at a 90° impact angle, the Watt's nickel cracked and chipped. In certain areas of the world, the modified Watt's nickel electroformed sheaths have eroded quite substantially at the tip of the propeller blade, requiring replacement of the sheath within as little as 70 hours of operations, wherein a typical mean time between unscheduled returns for such maintenance is 1,000 hours, and preferably 5000 hours.

There exists a need, therefore, for an electroformed sheath formed from a material or composition which is relatively inexpensive and exhibits improved erosion resistance at a variety of impact angles and other conditions, in comparison to currently used and known materials.

DISCLOSURE OF INVENTION

The primary object of this invention is to provide an improved electroformed sheath and an airfoiled component construction using the sheath, wherein the sheath exhibits excellent erosion resistance and high tensile strength at a variety of angular attacks by foreign objects such as birds, sand, stones, ice, etc and is formed at least in part from cobalt.

Another object of this invention is to provide an improved electroformed sheath for use with propellers, exit guide vanes, fan blades and structural members and an airfoiled component construction using the sheath, wherein the sheath is formed from a nickel-cobalt composition and exceeds the erosion performance levels of known electroformed sheaths.

Still another object of this invention is to provide an improved electroformed sheath formed from nickel-cobalt for use on airfoiled components such as aircraft propellers and an airfoiled component construction using the sheath, such as the aircraft propeller, wherein the sheath includes cobalt in the range of 30–54 wt. % based on the weight of the sheath.

And still another object of this invention is to provide an electroformed sheath formed for use on airfoiled components, and an airfoiled component construction using the sheath, wherein the sheath is formed from a nickel-cobalt composition which includes cobalt present at 42 wt. % based on the weight of the sheath.

The objects and advantages are achieved by the sheath of the present invention for covering and protecting a component leading edge of an airfoiled component. The sheath comprises a sheath leading edge, and a first protective side and a second protective side, wherein the first and second protective sides are merged at the leading edge. A cavity is formed between the first and second protective sides, wherein the cavity is adapted to have the airfoiled component positioned therein and engage an inside surface of each of the first and second protective sides. The sheath is formed from a material including cobalt and in a preferred embodiment a nickel-cobalt material composition. More particularly preferred embodiments include cobalt in the nickel-cobalt composition present between 8–32 wt. % and 30–54 wt. %, and substantially 42 wt. %, based on the weight of the sheath.

The objects and advantages set forth herein are further achieved by the airfoiled component construction of the present invention. This construction comprises a main structural member formed in the shape of an airfoil, wherein the member has a leading edge, and a sheath covering and protecting the leading edge, wherein the sheath is formed from a material including cobalt, and particularly from a nickel-cobalt composition. Preferred embodiments include cobalt in the nickel-cobalt composition present between 8–32 wt. %, 30–54 wt. %, and at substantially 42 wt. %, based on the weight of the sheath.

BRIEF DESCRIPTION OF THE DRAWINGS

FIG. 1 is a table indicative of the erosion properties of several currently used materials for forming electroform sheaths to afford protection to airfoiled components having leading edges which are highly susceptible to erosion damage, such as propellers and jet engine vanes;

FIG. 4 is a Table indicative of the erosion properties of the nickel-cobalt composition electroformed sheath of the present invention while on an airfoiled component such as a propeller or a jet engine vane, relative to the materials in Table 1 of FIG. 1.

BEST MODE FOR CARRYING OUT THE INVENTION

Figure 2:
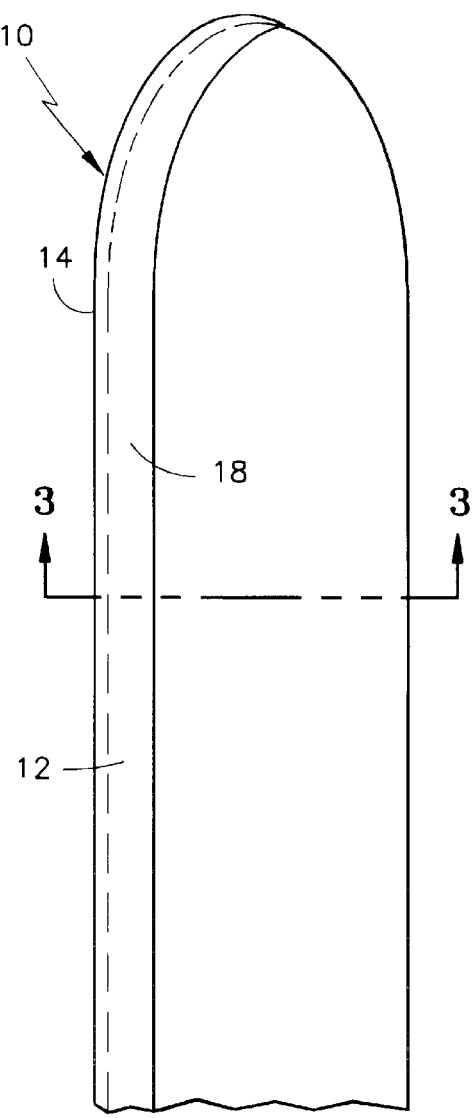
FIG. 2 is a perspective view of the nickel-cobalt sheath of the present invention installed on an airfoiled component, such as an aircraft propeller blade.
Figure 3:
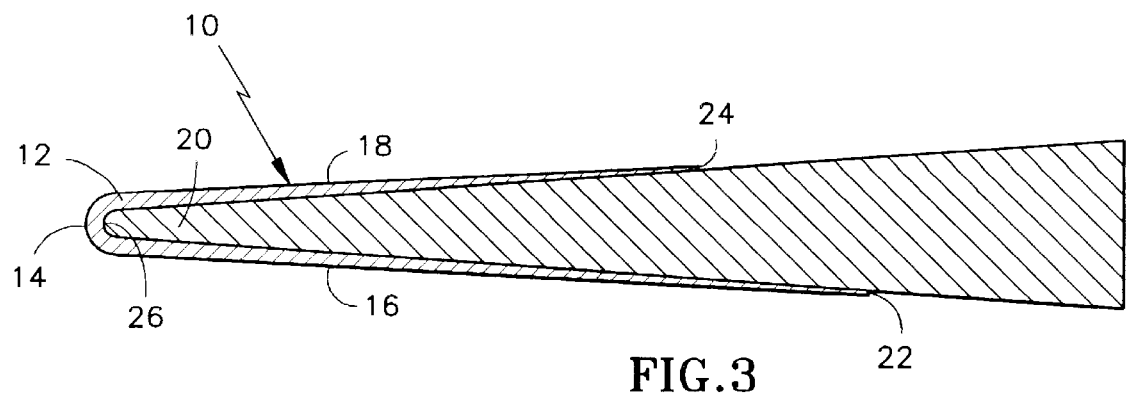
FIG. 3 is a cross-sectional view taken along lines 3–3 of FIG. 2.

Referring now to the drawings in detail, there is shown in FIGS. 2 and 3 a plan and cross-sectional view, respectively, of the electroformed sheath of the present invention installed on an airfoiled component, and particularly a propeller blade, wherein the sheath is designated generally as 10. While the sheath is shown installed on a propeller blade and described as such, it should be understood that the sheath is equally useful for airfoiled components such as fan blades, exit guide vanes, and aircraft structural supports which are placed in airstreams, which typically have very different shapes and sizes, and that the description applies equally to these components and the various shapes and sizes thereof.

As shown in FIGS. 2 and 3, sheath 10 includes a sheath body 12 with a leading edge 14, a pressure side 16, and an opposed suction side 18. The pressure and suction sides merge at leading edge 14 and extend from the leading edge to define a sheath cavity 20 for receiving the propeller blade or other airfoiled component. The pressure side ends at a pressure side trailing edge 22 and the suction side ends at a suction side trailing edge 24. A head section 26 of the body is formed between leading edge 14 and cavity 20. The thicknesses of the leading edge 14 and trailing edges 22 and 24 may vary as required by the particular application, such as in propeller applications where the leading edge is thicker than the trailing edges. Similarly, the pressure side 16 and suction side 18 may be of the same lengths, or of different lengths, as illustrated. As shown in FIGS. 2 and 3, sheath 10 is fixed by known means to a blade-like component of an aircraft, and preferably a composite such as an aircraft propeller. The sheath may be affixed to a propeller through adhesion or other known and effective means.

With respect to the process and other details used in forming electroform sheath 10, U.S. Pat. No. 4,950,375 to Leger and U.S. patent application Ser. No. 08/401,833 to Graff are hereby incorporated by reference, with specific regard to the detailed descriptions thereof. U.S. patent application Ser. No. 08/401,833 is commonly assigned to the assignee of the present invention, as is U.S. Pat. No. 4,950,375 to Leger.

Sheath 10 of the present invention is formed from a material including cobalt, and in a preferred embodiment from a hardened nickel-cobalt composition, for improving erosion resistance of the sheath and thereby its operating life relative to the currently known materials whose erosion resistant properties are provided, as discussed above, in Table 1 of FIG. 1.

An embodiment of the present includes the sheath formed from 100% cobalt. In a preferred embodiment, the cobalt is present in a nickel-cobalt composition in the range of 1–99 wt. %. In another preferred embodiment, the cobalt is present in the nickel-cobalt composition in the range of 30–54 wt. % based on the weight of the sheath, and in a more preferred embodiment, the cobalt is present in a range of 37–47 wt. %, and in an even more preferred embodiment, the cobalt is present in a range of 40–44 wt. %, and in the most preferred embodiment, cobalt is present at substantially 42 wt. % of the nickel-cobalt sheath, wherein the balance of the composition is preferably substantially nickel. In another preferred embodiment, the cobalt is present in the nickel-cobalt composition in the range of 8–32 wt. % based on the weight of the sheath, and in a more preferred embodiment, the cobalt is present in a range of 17–23 wt. %, and in another most preferred embodiment, the cobalt is present at substantially 20 wt. %, wherein the balance of the composition is preferably substantially nickel. In these nickel-cobalt composition embodiments, the nickel-cobalt preferably has a hardness of greater than 410 VHN.

The cobalt and nickel-cobalt composition sheaths provided above are preferably formed in sulfamate electrolytes doped with suitable hardening/brightening agents, by means known in the art. The sheaths are preferably electroformed into the desired blade engaging shape, as shown in FIG. 2 and 3 by known techniques, and most preferably via one of the electroforming techniques discussed in the above incorporated references.

With reference to FIG. 4 and Table 2 therein, a specific example of the erosion properties of the 42 wt. % cobalt, nickel-cobalt sheath, is given. Also, the erosion properties of 20.4 wt. % cobalt, nickel-cobalt sheath, is given. Sand traveling at 800 ft/sec, with 20/30 sieve size and a hardness of 1272 VHN, on average, was the eroding medium and hardened sulfamate nickel is the measurement baseline, as indicated in the background discussing Table 1. As can be seen from the Table, the 42 wt. % cobalt, nickel-cobalt sheath at both the 90° and 20° angle of attack exhibited the best erosion rate, i.e. the lowest a 0.157 and 0.170, cc-kilograms, respectively, wherein cc equals $cm^3$ of sheath stock-loss and kilogram equals quantity of erodent impacting the sample, along with the best erosion resistance. The 20.4% cobalt faired well in the 20° angle of attack measurement, showing better results than the modified Watt's nickel, hardened sulfamate nickel and titanium. At the 90° impact angle, the Watt's nickel cracked and chipped. For the 90° degree attack, the 20.4% cobalt composition performed only slightly worse than the hardened sulfamate nickel and modified Watt's nickel. In general, at both angles, titanium 6-4 exhibited the worst erosion rate with nickel hardened sulfamate and modified Watt's Nickel in the middle of the group.

Accordingly, as can be seen by referencing Table 2, the sheath having cobalt at 42% of the weight thereof, is a significant improvement over the sheaths using currently known materials or compositions. Sheaths formed from nickel-cobalt material exhibit a significant improvement over currently available sheaths and will allow for substantial increases in aircraft operation hours when used thereon, specifically with propellers and other blade-type applications, such as fan blades and exit guide vanes.

The primary advantage of this invention is that an improved electroformed sheath and an airfoiled component construction using the sheath are provided, wherein the sheath exhibits excellent erosion resistance and high tensile strength when subjected to a variety of angular attacks by foreign objects such as birds, sand, stones, ice, etc. and is formed from a material including cobalt. Another advantage of this invention is that an improved electroformed sheath for use with propellers, exit guide vanes, fan blades and structural members, and an airfoiled component construction using the sheath are provided, wherein the sheath is formed from a nickel-cobalt composition that exceeds the erosion performance levels of known electroformed sheaths under similar conditions. Still another advantage of this invention is that an improved electroformed sheath formed from nickel-cobalt for use on airfoiled components such as aircraft propellers and an airfoiled component construction using the sheath, such as an aircraft propeller, are provided, wherein the sheath includes cobalt in the range of 30-54 wt. % based on the weight of the nickel-cobalt sheath. Still another advantage of this invention is that an electroformed sheath formed for use on airfoiled components, and an airfoiled component construction using the sheath, are provided, wherein the sheath is formed from the nickel-cobalt composition which includes cobalt present at 42 wt. % based on the weight of the sheath.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A sheath for covering and protecting a component leading edge of an airfoiled component, comprising:
   a sheath leading edge;
   a first protective side and a second protective side, wherein said first and second protective sides merge at said sheath leading edge; and
   a cavity formed between said first and said second protective sides, wherein said cavity is adapted to have said airfoiled component positioned therein and engage an inside surface of each of said first and second protective sides,
   wherein said sheath is formed from a nickel-cobalt composition including at least 40 wt % nickel and cobalt present in a range of 30-54 wt % based on the weight of said sheath.

2. The sheath according to claim 1, wherein said nickel-cobalt composition includes cobalt present in a range of 37-47 wt. % based on the weight of said sheath.

3. The sheath according to claim 2, wherein said cobalt is present at 40-44 wt. % based on the weight of the sheath.

4. The sheath according to claim 3, wherein said cobalt is present at substantially 42 wt. % based on the weight of the sheath.

5. The sheath according to claim 1, wherein said nickel cobalt composition includes cobalt present in a range of 20-30 wt % and at least 70 wt % nickel based on the weight of said sheath.

6. The sheath according to claim 5, wherein said cobalt is present at substantially 17-23 wt. % based on the weight of the sheath.

7. The sheath according to claim 1, wherein said nickel-cobalt composition has a hardness of greater than 410 VHN.

8. The sheath according to claim 1, wherein said sheath is formed from 100% cobalt.

9. An airfoiled component construction, comprising:
   a main structural component formed in the shape of an airfoil, wherein said main structural component has a leading edge; and
   a sheath covering and protecting said leading edge, wherein said sheath is formed from a nickel-cobalt composition including at least 40 wt % nickel and cobalt present in a range of 30-54 wt % based on the weight of said sheath.

10. The construction according to claim 9, wherein said cobalt is present in a range of 37-47 wt. % based on the weight of said sheath.

11. The construction according to claim 10, wherein said cobalt is present at 40-44 wt. % based on the weight of the sheath.

12. The construction according to claim 11, wherein said cobalt is present at substantially 42 wt. % based on the weight of the sheath.

13. The airfoiled component according to claim 9, wherein said main structural component is formed from a composite.

14. The airfoiled component according to claim 13, wherein said main structural component is one of an aircraft propeller blade, a fan exit guide vane, an aircraft support strut and a jet engine fan blade.

15. The airfoiled component according to claim 9, wherein said material includes cobalt present in a range of 20-30 wt. % and at least 70% nickel based on the weight of said sheath.

16. The airfoiled component according to claim 15, wherein said cobalt is present at substantially 17-23 wt. % based on the weight of the sheath.

17. The airfoiled component according to claim 9, wherein said nickel-cobalt composition has a hardness of greater than 410 VHN.

18. The sheath according to claim 9, wherein said sheath is formed from 100% cobalt.

* * * * *